(12) United States Patent
Yang

(10) Patent No.: US 7,136,338 B2
(45) Date of Patent: Nov. 14, 2006

(54) SYSTEM AND METHOD FOR ADJUSTING A CONTROL LOOP BANDWIDTH

(75) Inventor: Jin-Bin Yang, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 602 days.

(21) Appl. No.: 10/390,646

(22) Filed: Mar. 19, 2003

(65) Prior Publication Data

US 2004/0081038 A1   Apr. 29, 2004

(30) Foreign Application Priority Data

Oct. 29, 2002  (TW) ................................ 91132118 A

(51) Int. Cl.
*G11B 7/09* (2006.01)
*G11B 7/00* (2006.01)

(52) U.S. Cl. .................. 369/53.15; 369/44.32

(58) Field of Classification Search ............ 369/44.32, 369/47.14, 53.12, 53.13, 53.14, 53.15, 53.16, 369/53.17, 53.32
See application file for complete search history.

(56) References Cited

U.S. PATENT DOCUMENTS

| | | | | |
|---|---|---|---|---|
| 4,722,079 A | * | 1/1988 | Matsumoto | 369/44.32 |
| 4,764,860 A | * | 8/1988 | Takao | 369/53.18 |
| 6,510,112 B1 | * | 1/2003 | Sakamoto et al. | 369/44.32 |
| 6,646,962 B1 | * | 11/2003 | Sasaki et al. | 369/44.35 |
| 6,801,482 B1 | * | 10/2004 | Iijima et al. | 369/44.33 |
| 6,914,861 B1 | * | 7/2005 | Chou et al. | 369/47.35 |

* cited by examiner

*Primary Examiner*—Thang V. Tran
*Assistant Examiner*—Nathan Danielsen
(74) *Attorney, Agent, or Firm*—Troxell Law Office, PLLC

(57) ABSTRACT

The present invention provides a control loop bandwidth adjusting system for adjusting a control loop bandwidth of an optical reproducing device. The optical reproducing device comprises a data signal processing circuit, which uses the control loop bandwidth to process the data signal. The control loop bandwidth adjusting system comprises a control loop bandwidth generator for generating the control loop bandwidth and a control loop bandwidth according to whether a defect signal corresponding to the defect data is received or not. If the control loop bandwidth adjusting module receives the defect data entry signal, the defect data duration signal, and the defect data exit signal, the control loope bandwidth is adjusted to a first bandwidth value, a second bandwidth value, and a third bandwidth value respectively.

19 Claims, 5 Drawing Sheets

SYSTEM AND METHOD FOR ADJUSTING A CONTROL LOOP BANDWIDTH

BACKGROUND OF THE INVENTION

1. Field of the Invention

The present invention relates to a control loop bandwidth adjusting method for adjusting a control loop bandwidth of an optical reproducing device, and more particularly to a data signal processing circuit for processing the data signal with the control loop bandwidth.

2. Description of the Prior Art

Please refer to FIG. 1. FIG. 1 is a schematic diagram of an optical reproducing device 10 that reads a data signal from an optical recording medium 12 according to the prior art. When the optical reproducing device 10 reads the data signal from the optical recording medium 12, an optical pickup head 14 uses a laser beam 16 to focus on the optical recording medium 12 in a predetermined distance and to write or read the corresponding optical data into or from the optical recording medium 12.

Generally, for writing or reproducing the optical data completely, a data signal processing circuit 18 is used for assisting in processing the data signal. The data signal processing circuit 18 can be a servo control circuit, a data/clock recovery PLL, or a slicer. The data signal processing circuit 18 can be a servo control circuit for processing actuation control to the optical pickup head 14, a data/clock recovery PLL for synchronizing the data signal, or a slicer for slicing the data signal.

However, when the optical reproducing device 10 reads the defect data signal from the optical recording medium 12, the defect data signal will generate a corresponding defect data signal, and the defect data signal will cause the optical reproducing device 10 to read incorrect data signals, then the data signal processing circuit 18 will perform an incorrect process.

SUMMARY OF THE INVENTION

It is therefore a primary objective of the present invention to provide a control loop bandwidth adjusting method for adjusting a control loop bandwidth of an optical reproducing device. The data signal processing circuit processes the data signal by means of the control loop bandwidth.

The present invention provides a control loop bandwidth adjusting system for adjusting a control loop bandwidth of an optical reproducing device. The optical reproducing device comprises a data signal reproducing circuit, a data signal processing circuit, and a defect detection circuit. The data signal reproducing circuit is used for reproducing a data signal from an optical recording medium. The data signal processing circuit processes the data signal by means of the control loop bandwidth. The defect detection circuit is used for detecting if there is any defect data signal on the optical recording medium, and generating a set of corresponding defect data signals during the occurrence of the defect data signal. The control loop bandwidth adjusting system comprises a control loop bandwidth generator and a control loop bandwidth adjusting module. The control loop bandwidth generator is used for generating the control loop bandwidth, and the control loop bandwidth is adjusted to one of the following values, a predetermined bandwidth value, a first bandwidth value, a second bandwidth value, and a third bandwidth value. The control loop bandwidth adjusting module is used for receiving the set of defect data signals to adjust the bandwidth value of the control loop bandwidth. If the control loop bandwidth adjusting module receives the set of defect data entry signals, adjust the control loop bandwidth to the first bandwidth value and make the data signal processing circuit process the data signal with the first bandwidth value. If the control loop bandwidth adjusting module receives the set of defect data duration signals, adjust the control loop bandwidth to the second bandwidth value and make the data signal processing circuit process the data signal with the second bandwidth value. If the control loop bandwidth adjusting module receives the set of defect data exit signals, the control loop bandwidth is adjusted to the third bandwidth value and make the data signal processing circuit process the data signal with the third bandwidth value. If the control loop bandwidth adjusting module does not receive the defect data signals anymore, the control loop bandwidth value is recovered to the predetermined bandwidth value and make the data signal processing circuit process the data signal with the recovered control loop bandwidth.

By dynamically adjusting the different control loop bandwidth values in the different phases after data defect, the optical reproducing device will not make the data signal processing circuit perform an incorrect process as reproducing the defect data signal. The optical reproducing device can speed up the data signal processing circuit to use the signals of the normal area when the defect enters or exits.

These and other objects, features and advantages of the present invention will become apparent from the following detailed description of illustrative embodiments thereof, which is to be read in connection with the accompanying drawings.

BRIEF DESCRIPTION OF THE APPENDED DRAWINGS

DETAILED DESCRIPTION OF THE INVENTION

Figure 1:
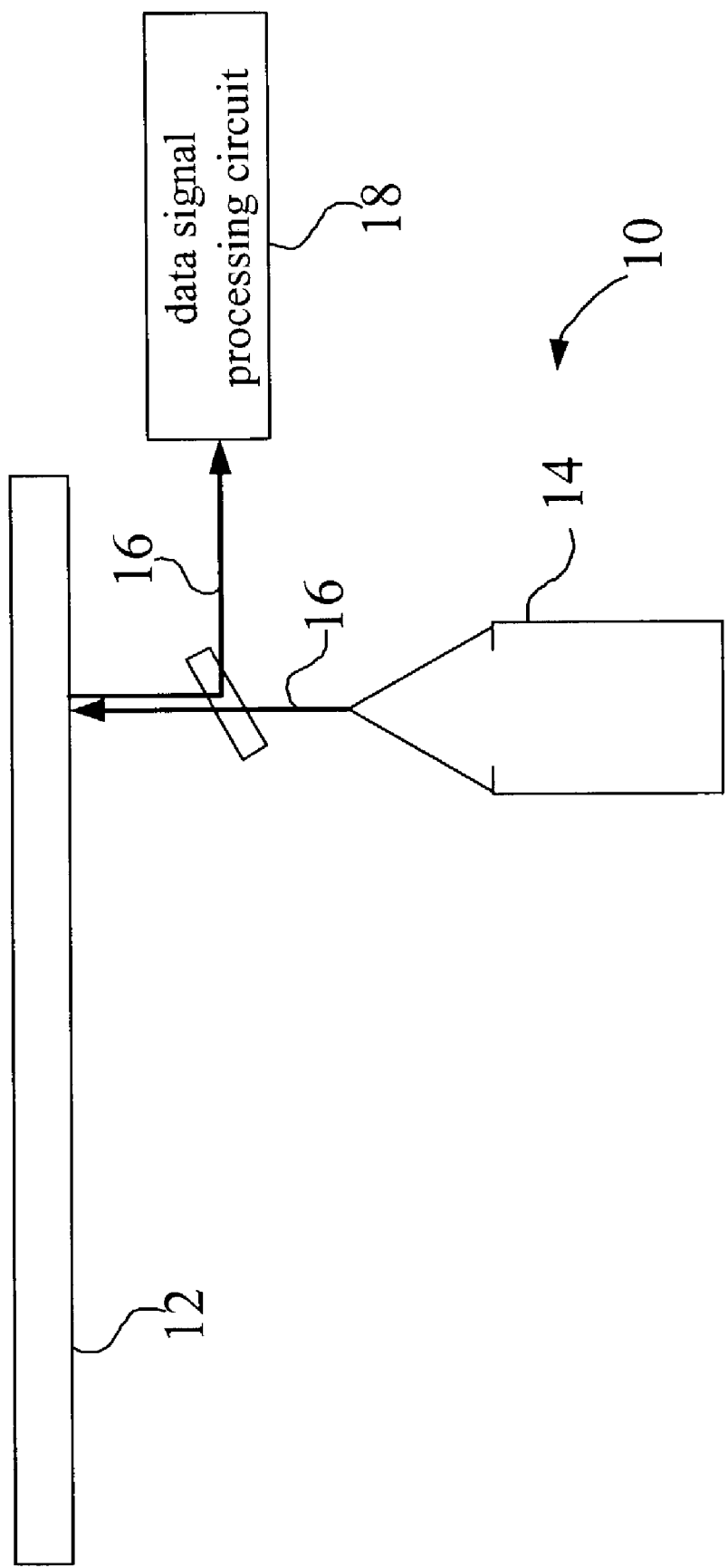
FIG. 1 is a schematic diagram of an optical reproducing device that reads a data signal from an optical recording medium according to the prior art.
Figure 2:
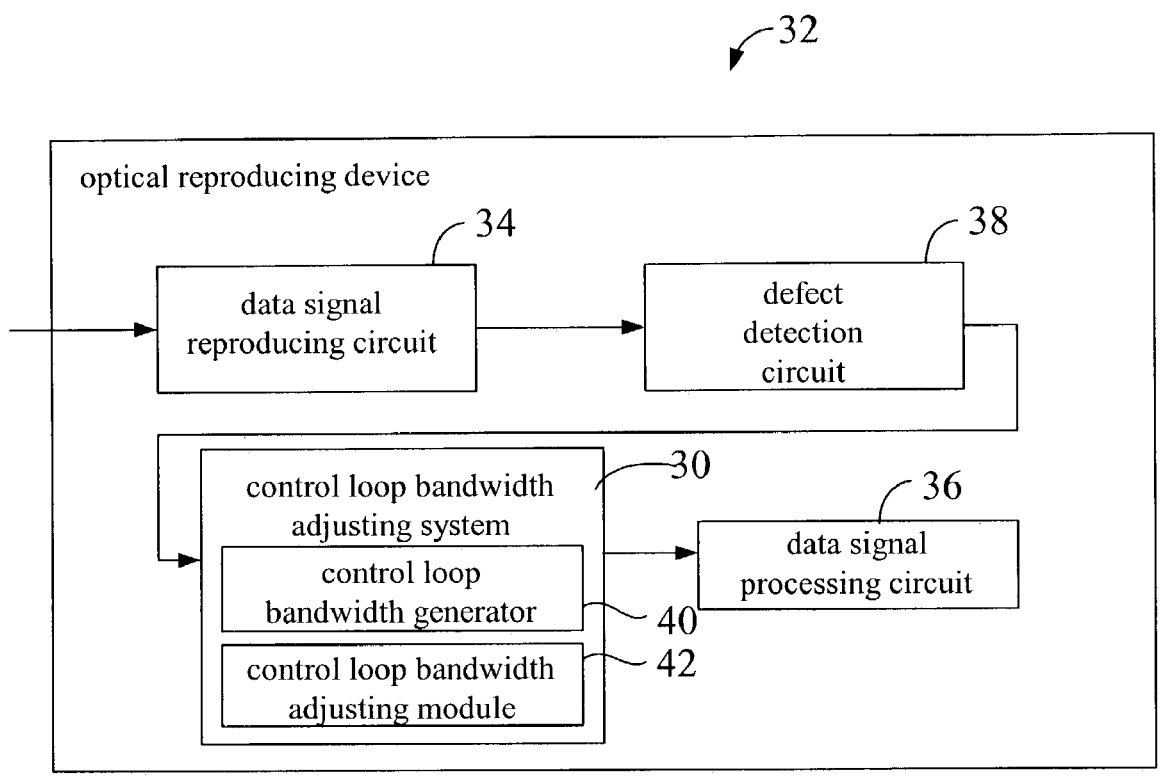
FIG. 2 is a block diagram of a control loop bandwidth adjusting system and an optical reproducing device according to the present invention.

Please refer to FIG. 2. FIG. 2 is a block diagram of a control loop bandwidth adjusting system 30 and an optical reproducing device 32 according to the present invention. The control loop bandwidth adjusting system 30 of the present invention is used for adjusting a control loop bandwidth of an optical reproducing device 32. The optical reproducing device 32 comprises a data signal reproducing circuit 34, a data signal processing circuit 36, and a defect detection circuit 38. The data signal reproducing circuit 34 is used for reproducing a data signal from an optical recording medium, and the data signal may be a RF signal. The data signal processing circuit 36 processes the data signal by means of the control loop bandwidth. The defect detection circuit 38 is used for detecting if there is any defect data signal on the optical recording medium, and generating a set of corresponding defect data signals during the occurrence of the defect data. The defect detection circuit 38 not only detects if there is any defect data signal on the optical recording medium but also detects if there is a defect data entry signal, a defect data duration signal, or a defect data exit signal.

The control loop bandwidth adjusting system 30 of the present invention comprises a control loop bandwidth generator 40 and a control loop bandwidth adjusting module 42. The control loop bandwidth generator 40 is used for generating the control loop bandwidth, and the control loop bandwidth can be adjusted to a predetermined bandwidth value, a first bandwidth value, a second bandwidth value, and a third bandwidth value. The control loop bandwidth adjusting module 42 is used for receiving the set of defect data signals to adjust the bandwidth values of the set of the control loop bandwidths.

If the control loop bandwidth adjusting module 42 receives the set of defect data entry signals, which means that the control loop bandwidth adjusting system 30 receives the set of defect data entry signals, the control loop bandwidth is adjusted to the first bandwidth value and the data signal processing circuit 36 processes the data signal with the first bandwidth value. If the control loop bandwidth adjusting module 42 receives the set of defect data duration signals, the control loop bandwidth is adjusted to the second bandwidth value and the data signal processing circuit 36 processes the data signal with the second bandwidth value. If the control loop bandwidth adjusting module 42 receives the set of defect data exit signals, the control loop bandwidth is adjusted to the third bandwidth value and the data signal processing circuit 36 processes the data signal with the third bandwidth value. If the control loop bandwidth adjusting module 42 does not receive the defect data signals anymore, which means that the control loop bandwidth adjusting system 30 does not receive the defect data signals anymore, the control loop bandwidth value is recovered to the predetermined bandwidth value and the data signal processing circuit 36 processes the data signal with the recovered control loop bandwidth.

As shown in FIG. 2, in the control loop bandwidth adjusting system 30, the data signal processing circuit 36 has a lot of functions. The data signal processing circuit 36 may be a servo control circuit for controlling an optical pickup head of the optical reproducing device 32 to read the data signal from the optical recording medium. The servo control circuit will speed up, slow down, or stop the actuation control to the optical pickup head as receiving the adjusted control loop bandwidth and resume the original actuation control to the optical pickup head as receiving the recovered control loop bandwidth.

The data signal processing circuit 36 may be a data/clock recovery PLL. By varying the charging pump circuit, the data/clock recovery PLL can speed up, slow down, or stop to synchronize the data signal as receiving the adjusted control loop bandwidth and resume the original synchronization to the data signal as receiving the recovered control loop bandwidth. The data signal processing circuit 36 may also be a slicer. The slicer will speed up, slow down, or stop the slicing level control of the data signal as receiving the adjusted control loop bandwidth and resume the original slicing level control of the data signal as receiving the recovered control loop bandwidth.

Figure 3A:
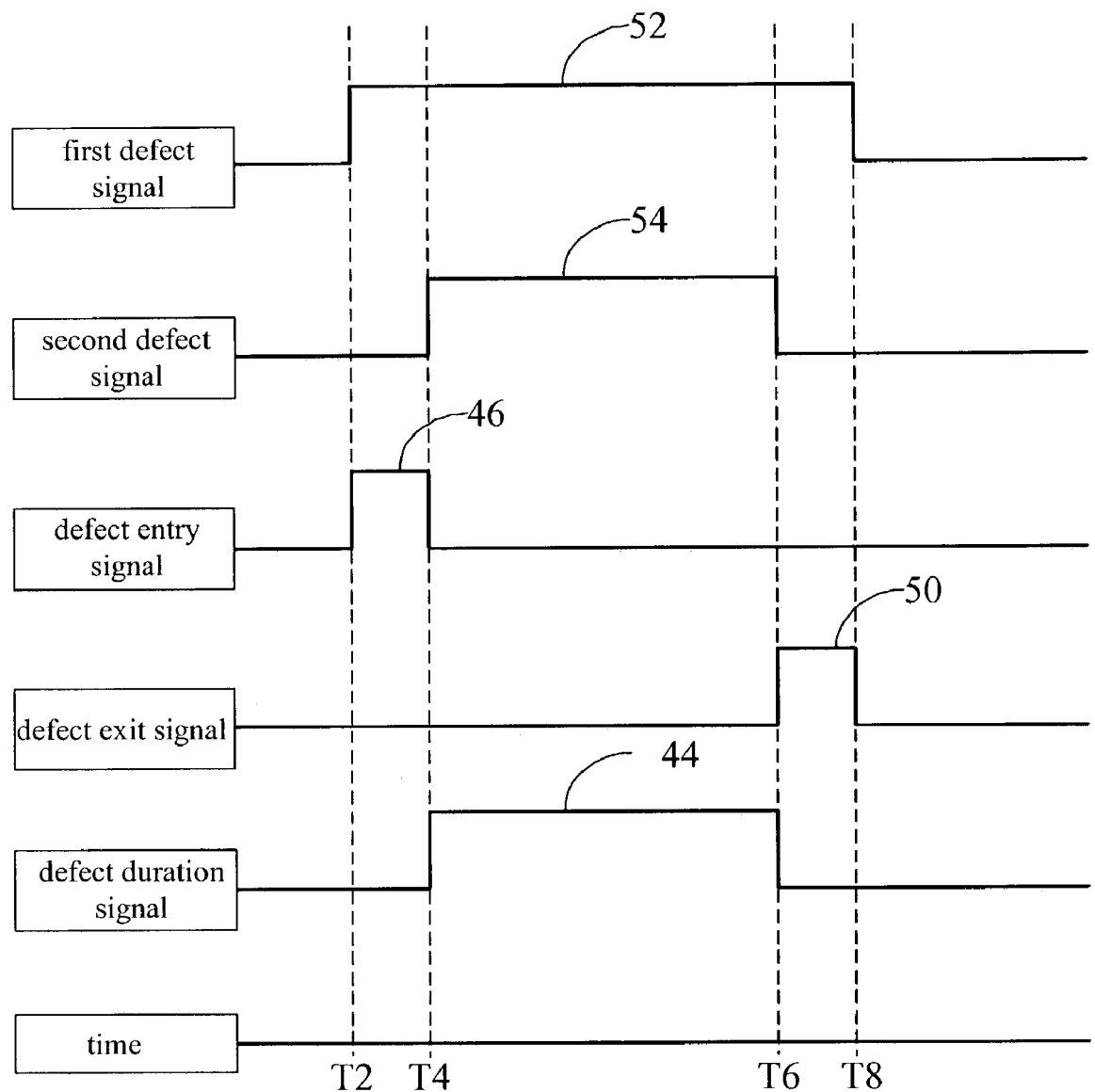
FIG. 3A is a schematic diagram of a defect data signal according to the present invention.

Please refer to FIG. 3A. FIG. 3A is a schematic diagram of a defect data signal according to the present invention. In the control loop bandwidth adjusting system 30 of the preferred embodiment in FIG. 2, the set of defect data signals generated by the defect detection circuit 38 are determined by a set of signals. The set of signals comprise a defect entry signal 46, a defect duration signal 44, and a defect exit signal 50. The defect detection circuit 38 comprises a predetermined first defect level and a predetermined second defect level. The defect detection circuit 38 generates a first defect signal 52 when the data signal is lower than the first defect level. The first defect signal 52 starts at time T2 and ends at time T8. The defect detection circuit 38 generates a second defect signal 54 when the data signal is lower than the second defect level. The second defect signal 54 starts at time T4 and ends at time T6. According to the relationship between the first defect signal 52 and the second defect signal 54, the defect entry signal 46, the defect duration signal 44, the defect exit signal 50 can be obtained, and the defect data signal can be further obtained.

Figure 3B:
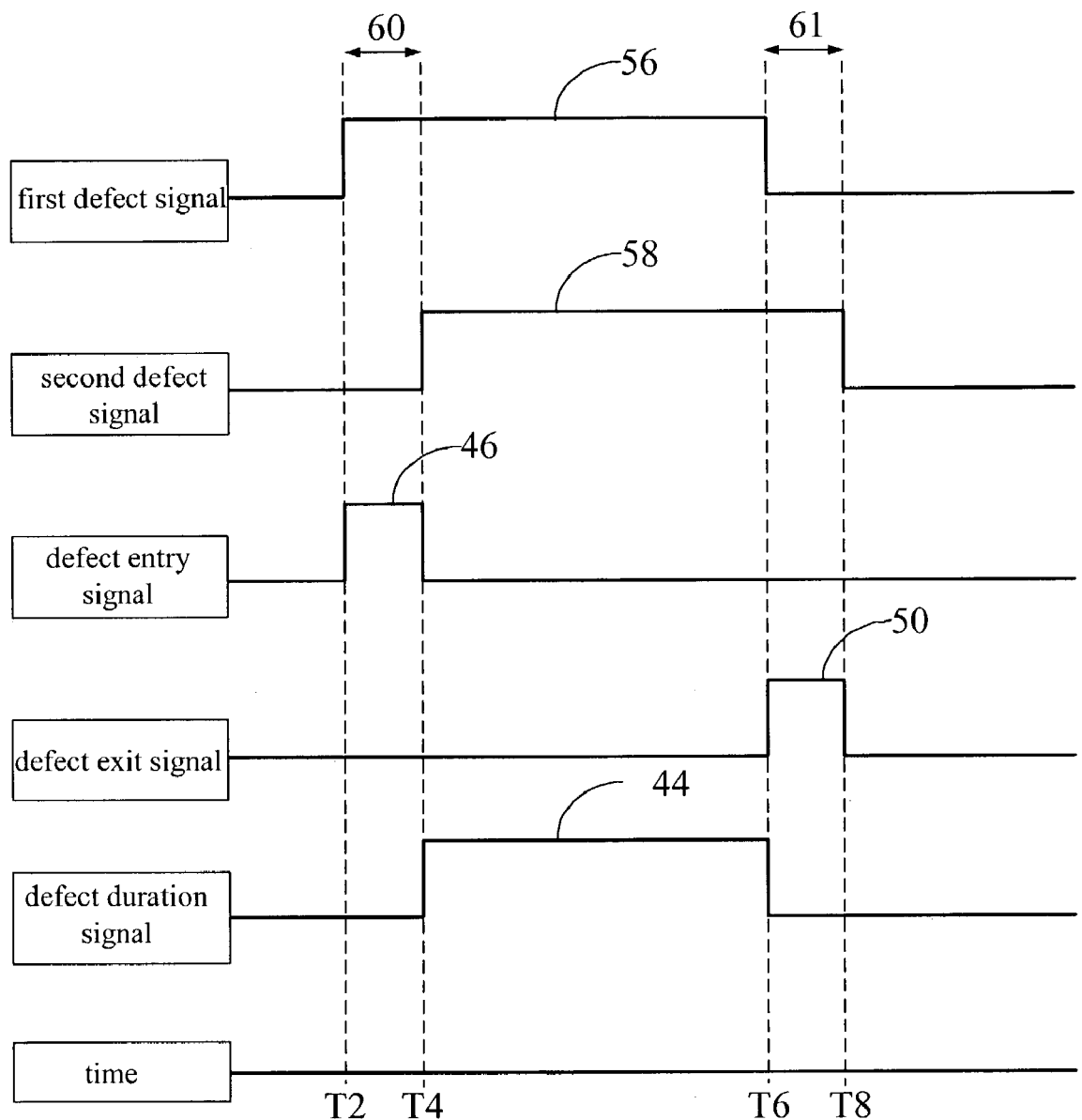
FIG. 3B is a schematic diagram of another defect data signal according to the present invention.

Besides, please refer to FIG. 3B. FIG. 3B is a schematic diagram of another defect data signal according to the present invention. According to the relationship between the first defect signal 56 and the second defect signal 58 generated by a predetermined delay value 60 and value 61, the present invention can generate the defect entry signal 46, the defect duration signal 44, and the defect exit signal 50. The first defect signal 56 starts at time T2 and ends at time T6, and the second defect signal 58 starts at time T4 and ends at time T8.

Figure 4:
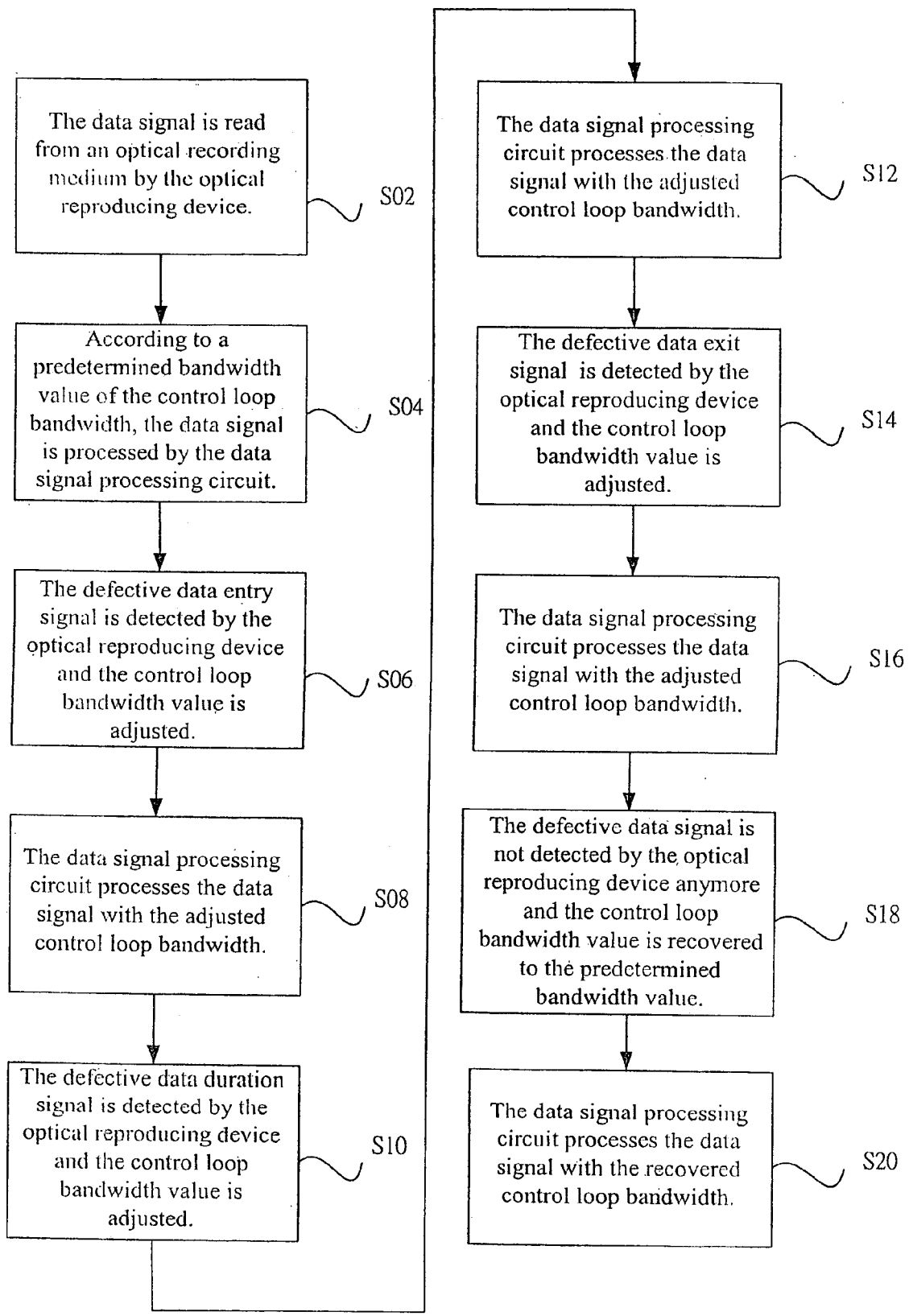
FIG. 4 is a flowchart of a control loop bandwidth adjusting method according to the present invention.

Please refer to FIG. 4. FIG. 4 is a flowchart of a control loop bandwidth adjusting method according to the present invention. The present invention provides a control loop bandwidth adjusting method for adjusting a control loop bandwidth of an optical reproducing device 32. The optical reproducing device 32 comprises a data signal processing circuit 18, which processes a data signal by means of the control loop bandwidth. The adjusting method of the present invention is described in the following by FIG. 2 and FIG. 4.

First, in step S02, the data signal is read from an optical recording medium by the optical reproducing device 32. The data signal can be a RF signal. In step S04, according to a predetermined bandwidth value of the control loop bandwidth, the data signal is processed by the data signal processing circuit 18. In step S06, if the control loop bandwidth adjusting system receives the defect data entry signal as reproducing the data signal, which represents that the defect data entry signal is detected by the optical reproducing device 32, the control loop bandwidth value is adjusted. In step S08, the data signal processing circuit 18 processes the data signal with the adjusted control loop bandwidth. In step S10, if the control loop bandwidth adjusting system receives the defect data duration signal as reproducing the data signal, which represents that the defect data duration signal is detected by the optical reproducing device 32, the control loop bandwidth value is adjusted. In step S12, the data signal processing circuit 18 processes the data signal with the adjusted control loop bandwidth. In step S14, if the control loop bandwidth adjusting system receives the defect data exit signal as reproducing the data signal, which represents that the defect data exit signal is detected by the optical reproducing device 32, the control loop bandwidth value is adjusted. In step S16, the data signal processing circuit 18 processes the data signal with the adjusted control loop bandwidth. In step S18, if the control loop bandwidth adjusting system 30 doesn receive the defect data signal anymore as reproducing data signal, which represents the defect data signal is not detected by the optical reproducing device 32 anymore, the control loop bandwidth value is recovered to the predetermined bandwidth value. Finally, in step S20, the data signal processing circuit 18 processes the data signal with the recovered control loop bandwidth.

According to the adjusting method of the above, the data signal processing circuit 36 can be a servo control circuit, a data/clock recovery PLL, or a slicer as the same in the above-mentioned adjusting system 30.

The adjusting method shown in FIG. 4, the optical reproducing device 32 further comprises a defect detection circuit 38, and the functions thereof and the method of generating the defect entry signal, the defect duration signal, and the defect exit signal are shown in FIG. 3A and FIG. 3B.

Therefore, the present invention provides a control loop bandwidth adjusting system 30 for adjusting a control loop bandwidth of an optical reproducing device 32. If the control loop bandwidth adjusting module receives the set of defect data entry signals 46, the control loop bandwidth is adjusted to the first bandwidth value and the data signal processing circuit 36 processes the data signal with the first bandwidth value. If the control loop bandwidth adjusting module receives the set of defect data duration signals 44, the control loop bandwidth is adjusted to the second bandwidth value and the data signal processing circuit 36 processes the data signal with the second bandwidth value. If the control loop bandwidth adjusting module receives the set of defect data exit signals 50, the control loop bandwidth is adjusted to the third bandwidth value and the data signal processing circuit 36 processes the data signal with the third bandwidth value. According to the above, due to using the specific and adjusted bandwidth value respectively at different times in the defect data area, the optical reproducing device 32 will not make the data signal processing circuit 36 perform an incorrect process by reproducing the defect data signal. The optical reproducing device 32 adopts another proper bandwidth value to use the useful data signal between the normal and defect area.

While the invention has been described in the preferred embodiments, it is understood that the used words are words of description rather than words of limitation and that changes within the purview of the appended claims may be made without departing from the scope and spirit of the invention in its broader aspect.

What is claimed is:

1. A control loop bandwidth adjusting method for adjusting a control loop bandwidth of an optical reproducing device, the optical reproducing device comprising a data signal processing circuit which processes a data signal by means of the control loop bandwidth, the adjusting method comprising the steps of:

reproducing the data signal from an optical recording medium by the optical reproducing device;

according to a predetermined bandwidth value of the control loop bandwidth, processing the data signal by the data signal processing circuit;

if a defect data entry signal is detected by the optical reproducing device as reproducing the data signal, adjusting the control loop bandwidth to a first bandwidth value and making the data signal processing circuit process the data signal with the adjusted control loop bandwidth;

if a defect data duration signal is detected by the optical reproducing device as reproducing the data signal, adjusting the control loop bandwidth to a second bandwidth value and making the data signal processing circuit process the data signal with the adjusted control loop bandwidth;

if a defect data exit signal is detected by the optical reproducing device as reproducing the data signal, adjusting the control loop bandwidth to a third bandwidth value and making the data signal processing circuit process the data signal with the adjusted control loop bandwidth; and if a defect data signal is not detected by the optical reproducing device anymore as reproducing the data signal, recovering the control loop bandwidth value to the predetermined bandwidth value and making the data signal processing circuit process the data signal with the recovered control loop bandwidth.

2. The adjusting method of claim 1, wherein the data signal processing circuit is a servo control circuit for controlling an optical pickup head of the optical reproducing device to read the data signal from the optical recording medium, and the servo control circuit will speed up, slow down, or stop the actuation control to the optical pickup head as receiving the adjusted control loop bandwidth, while the servo control circuit will resume the original actuation control to the optical pickup head as receiving the recovered control loop bandwidth.

3. The adjusting method of claim 1, wherein the data signal processing circuit is a data/clock recovery PLL, and the data/clock recovery PLL will speed up, slow down, or stop to synchronize the data signal as receiving the adjusted control loop bandwidth, while the data/clock recovery PLL will resume the original synchronization to the data signal as receiving the recovered control loop bandwidth.

4. The adjusting method of claim 1, wherein the data signal processing circuit is a slicer, and the slicer will speed up, slow down, or stop the slicing level control of the data signal as receiving the adjusted control loop bandwidth, while the slicer will resume the original the slicing level control of the data signal as receiving the recovered control loop bandwidth.

5. The adjusting method of claim 1, wherein the data signal is a data RF signal.

6. The adjusting method of claim 1, wherein the optical reproducing device further comprises a defect detection circuit for detecting if there are the defect data entry signal, the defect data duration signal, and the defect data exit signal, and if the occurrence of the defect data is terminated.

7. The adjusting method of claim 6, wherein the defect detection circuit will generate a set of corresponding defect data signals during the occurrence of the defect data.

8. The adjusting method of claim 7, wherein the set of defect data signals are determined by a set of signals, and the set of signals comprise the defect entry signal, the defect duration signal, and the defect exit signal.

9. The adjusting method of claim 8, wherein the defect detection circuit comprises a predetermined first defect level and a predetermined second defect level, generating a first defect signal when the data signal is lower than the first defect level and a second defect signal when the data signal is lower than the second defect level, according to the relationship between the first defect signal and the second defect signal, getting the defect entry signal, the defect duration signal, and the defect exit signal.

10. The adjusting method of claim 8, wherein the defect detection circuit comprises a predetermined defect level and two predetermined delay values, generating a first defect signal when the data signal is lower than the defect level and getting a second defect signal by delaying the predetermined delay values according to the edge of the first defect signal, according to the relationship between the first defect signal and the second defect signal, getting the defect entry signal, the defect duration signal, and the defect exit signal.

11. A control loop bandwidth adjusting system for adjusting a control loop bandwidth of an optical reproducing device, the optical reproducing device comprising:
- a data signal reproducing circuit for reproducing a data signal from an optical recording medium;
- a data signal processing circuit for using the control loop bandwidth to process the data signal;
- a defect detection circuit for detecting if there is any defect data signal on the optical recording medium, and generating a set of corresponding defect data signals during the occurrence of the defect data;

the control loop bandwidth adjusting system comprising:
- a control loop bandwidth generator for generating the control loop bandwidth, the control loop bandwidth being adjusted to one of the following values, a predetermined bandwidth value, a first bandwidth value, a second bandwidth value, and a third bandwidth value; and
- a control loop bandwidth adjusting module for receiving the set of defect data signals to adjust the bandwidth value of the control loop bandwidth;

wherein if the control loop bandwidth adjusting module receives a set of defect data entry signals, adjusting the control loop bandwidth to the first bandwidth value and making the data signal processing circuit process the data signal with the first bandwidth value, if the control loop bandwidth adjusting module receives a set of defect data duration signals, adjusting the control loop bandwidth to the second bandwidth value and making the data signal processing circuit process the data signal with the second bandwidth value, if the control loop bandwidth adjusting module receives a set of defect data exit signals, adjusting the control loop bandwidth to the third bandwidth value and making the data signal processing circuit process the data signal with the third bandwidth value, and if the control loop bandwidth adjusting module does not receive the set of defect data signals anymore, recovering the control loop bandwidth value to the predetermined bandwidth value and making the data signal processing circuit process the data signal with the recovered control loop bandwidth.

12. The adjusting system of claim 11, wherein the data signal processing circuit is a servo control circuit for controlling an optical pickup head of the optical reproducing device to read the data signal from the optical recording medium, and the servo control circuit will speed up, slow down, or stop the actuation control to the optical pickup head as receiving the adjusted control loop bandwidth, while the servo control circuit will resume the original actuation control to the optical pickup head as receiving the recovered control loop bandwidth.

13. The adjusting system of claim 11, wherein the data signal processing circuit is a data/clock recovery PLL, and the data/clock recovery PLL will speed up, slow down, or stop to synchronize the data signal as receiving the adjusted control loop bandwidth, while the data/clock recovery PLL will resume the original synchronization to the data signal as receiving the recovered control loop bandwidth.

14. The adjusting system of claim 11, wherein the data signal processing circuit is a slicer, and the slicer will speed up, slow down, or stop the slicing level control of the data signal as receiving the adjusted control loop bandwidth, while the slicer will resume the original slicing level control of the data signal as receiving the recovered control loop bandwidth.

15. The adjusting system of claim 11, wherein the data signal is a data RF signal.

16. The adjusting system of claim 11, wherein the defect detection circuit detects the data signal of the optical recording medium if there are a defect data entry signal, a defect data duration signal, and a defect data exit signal, and if the occurrence of the defect data is terminated.

17. The adjusting system of claim 16, wherein the set of defect data signals comprise the defect entry signal, the defect duration signal, and the defect exit signal.

18. The adjusting system of claim 17, wherein the defect detection circuit comprises a predetermined first defect level and a predetermined second defect level, generating a first defect signal when the data signal is lower than the first defect level and a second defect signal when the data signal is lower than the second defect level, according to the relationship between the first defect signal and the second defect signal, getting the defect entry signal, the defect duration signal, and the defect exit signal.

19. The adjusting system of claim 17, wherein the defect detection circuit comprises a predetermined defect level and two predetermined delay values, generating a first defect signal when the data signal is lower than the defect level and getting a second defect signal by delaying the predetermined delay values according to the edge of the first defect signal, according to the relationship between the first defect signal and the second defect signal, getting the defect entry signal, the defect duration signal, and the defect exit signal.

* * * * *